(12) United States Patent
Gietl et al.

(10) Patent No.: US 10,091,956 B2
(45) Date of Patent: Oct. 9, 2018

(54) SUBSURFACE IRRIGATION SYSTEMS AND METHODS

(71) Applicants: Jutta M. Gietl, Reno, NV (US); Adelheid Putze, Henderson, NV (US)

(72) Inventors: Jutta M. Gietl, Reno, NV (US); Adelheid Putze, Henderson, NV (US)

(*) Notice: Subject to any disclaimer, the term of this patent is extended or adjusted under 35 U.S.C. 154(b) by 0 days.

(21) Appl. No.: 15/283,061

(22) Filed: Sep. 30, 2016

(65) Prior Publication Data
US 2018/0092311 A1 Apr. 5, 2018

(51) Int. Cl.
*A01G 29/00* (2006.01)
*A01G 25/06* (2006.01)
*A01G 25/16* (2006.01)

(52) U.S. Cl.
CPC ............ *A01G 29/00* (2013.01); *A01G 25/06* (2013.01); *A01G 25/167* (2013.01)

(58) Field of Classification Search
CPC ...... A01G 29/00; A01G 25/06; A01G 25/167; A01G 31/001
See application file for complete search history.

(56) References Cited

U.S. PATENT DOCUMENTS

| | | | |
|---|---|---|---|
| 1,989,427 A * | 1/1935 | Robey | A01G 25/02 137/236.1 |
| 2,052,020 A * | 8/1936 | Black | A01G 25/06 138/140 |
| 2,566,833 A * | 9/1951 | Healy | A01G 25/02 239/266 |
| 2,653,449 A | 9/1953 | Stauch | |
| 3,361,359 A * | 1/1968 | Chapin | A01G 25/02 239/145 |
| 3,521,821 A * | 7/1970 | Emsbach | A01G 25/06 138/124 |

(Continued)

FOREIGN PATENT DOCUMENTS

| | | | |
|---|---|---|---|
| BE | 1011763 | 12/1999 | |
| CA | 2906064 A1 * | 3/2016 | ......... A01G 13/0268 |

(Continued)

OTHER PUBLICATIONS

Mohamed Abuarab, Ehab Mostafa, and Mohamed Ibrahim, "Effect of air injection under subsurface drip irrigation on yield and water use efficiency of corn in a sandy clay loam soil," Journal of Advanced Research (2013), Sep. 16, 2012, 7 pages (493-499), 2090-1232 © 2012 Cairo University.

(Continued)

*Primary Examiner* — Tara Mayo-Pinnock
(74) *Attorney, Agent, or Firm* — Weide & Miller, Ltd.

(57) ABSTRACT

A subsurface irrigation system is provided that includes a plurality of subsurface irrigation sleeves defining an area that has a first side and a second side. At least one of the first side and the second side is configured to be hydrophilic. The plurality of subsurface irrigation sleeves each include a tunnel. Tubing connects a first sleeve of the plurality of subsurface irrigation sleeves to a second sleeve of the plurality of subsurface irrigation sleeves. The tubing is configured to pass through the tunnels of the plurality of irrigation sleeves. An emitter is disposed on the tubing within the tunnel, the emitter emitting fluid to the area of the plurality of subsurface irrigation sleeves.

18 Claims, 12 Drawing Sheets

(56) References Cited

U.S. PATENT DOCUMENTS

| | | | | |
|---|---|---|---|---|
| 3,774,850 | A | * | 11/1973 | Zeman ............... A01G 25/02 239/542 |
| 3,929,258 | A | | 12/1975 | Stephens |
| 3,966,233 | A | * | 6/1976 | Diggs ............... A01G 25/023 239/288.5 |
| 3,996,968 | A | * | 12/1976 | Bergman ............ A01G 25/06 138/103 |
| 4,139,159 | A | | 2/1979 | Inque et al. |
| 5,374,138 | A | * | 12/1994 | Byles ............... A01G 25/06 138/103 |
| 5,752,784 | A | * | 5/1998 | Motz ............... A01G 25/06 405/37 |
| 5,839,659 | A | | 11/1998 | Murray |
| 5,938,372 | A | * | 8/1999 | Lichfield ........... A01G 25/06 405/36 |
| 6,571,833 | B1 | * | 6/2003 | McLarty ............ G02B 6/4459 112/155 |
| 7,488,523 | B1 | * | 2/2009 | Muncaster .......... B32B 11/04 404/17 |
| 8,129,019 | B2 | | 3/2012 | Pourdeyhimi et al. |
| 9,650,271 | B2 | * | 5/2017 | Potts ............... C02F 3/046 |
| 2002/0013111 | A1 | * | 1/2002 | Dugan ............... D01F 8/14 442/335 |
| 2003/0017001 | A1 | | 1/2003 | Ogi |
| 2008/0105612 | A1 | | 5/2008 | Chappas |
| 2008/0210785 | A1 | * | 9/2008 | Hou ............... A01G 25/06 239/542 |
| 2010/0282859 | A1 | | 11/2010 | Helbig et al. |
| 2011/0030275 | A1 | * | 2/2011 | Brown ............... A01G 25/167 47/65.7 |
| 2011/0110720 | A1 | * | 5/2011 | Huang ............... A01G 25/06 405/45 |
| 2012/0279120 | A1 | * | 11/2012 | Prescott ............ A01G 27/003 47/48.5 |
| 2016/0088806 | A1 | | 3/2016 | Haub et al. |

FOREIGN PATENT DOCUMENTS

| | | | | |
|---|---|---|---|---|
| DE | 2528166 | | 2/1976 | |
| DE | 4037396 | | 5/1991 | |
| DE | 69514365 | | 7/2000 | |
| DE | 102011083742 A1 | * | 3/2013 | ............ A01G 25/06 |
| EP | 2248414 | | 11/2010 | |
| FR | 2514046 | | 4/1983 | |
| GB | 1018850 | | 2/1966 | |
| WO | 02/082888 | | 10/2002 | |
| WO | 2013107954 | | 7/2013 | |

OTHER PUBLICATIONS

CIPO Examination Search Report, dated Feb. 21, 2017 for Application No. 2,906,064, 3 pages.

International Search Report and Written Opinion for PCT/US/17054582 dated Dec. 26, 2017, 10 pages.

* cited by examiner

SUBSURFACE IRRIGATION SYSTEMS AND METHODS

BACKGROUND

The disclosed embodiments relate to subsurface irrigation systems for supplying fluids to the root region of plants.

The term "irrigation" is understood to be the supplying of fluids, in particular water and/or nutrient solutions, to plants. To irrigate plants, water can be applied to the soil and the plants from above. In order to minimize water loss, the water can be applied in the vicinity of the individual plants by spray devices or drip devices. However, such spray and drip devices still suffer from water lost, such as through evaporation, wind drift, overspray, and excessive run off.

These disadvantages can be avoided if irrigation systems are used that are placed underground in the soil beneath the plants. Such irrigation systems include irrigation mats that are equipped with irrigation tubes, which are connected to the water supply system by means of valves and control units.

The use of subsurface irrigation continues to increase in residential and commercial landscaping, horticulture, green houses, and agriculture. This is because subsurface irrigation can provide significant savings in water usage as compared to conventional irrigation while simultaneously leading to higher yields in agriculture and to healthier plant growth in landscaping and horticulture.

Subsurface irrigation is an important step to avoid unnecessary overspray, runoffs, damaged walkways and walls, calcified windows, and the like. Further, subsurface irrigation may allow the reusing of rain-, storm- or recycled water for irrigation purposes because it may keep odors underground and may keep such water away from direct contact with humans or animals such as pets.

DE 695 14 365 T2 has disclosed a capillary irrigation system of this kind, which has an irrigation mat that is equipped with a plurality of perforated irrigation tubes. The irrigation mat is composed of an upper layer of a capillary material and a lower layer of a capillary material, between which the irrigation tubes are situated. The terms "above" and "below" relate to the orientation of the irrigation mat when placed in the soil.

To accommodate the tubes, pockets are provided between the two layers of capillary material, formed by folding the upper layer. The preformed pockets are dimensioned so that the irrigation tubes can be slid into the pockets. The two layers are attached to each other, for example by means of gluing, sewing, ultrasound, or welding. The attachments here are seam-like connections, which have the disadvantage that, for example, sewing threads can break and the attachment points can come loose. The placement of such mats is then significantly more complex due to the slippage of the individual layers. Since such mats have edge lengths of 50 m or more, not only does this impede the handling and laying of the mats, but the tubes can also slip laterally and assume positions other than those provided. A uniform distribution of water in the irrigation mat is no longer possible in this case.

Further, when using a mat where layers are threaded together, the installation time and labor required is very high. Cutting threads requires specific tools, and even then the individual threads tend to get stuck in the tools. Further, the threads may be cut loose from the layers when they are cut by the tools, further weakening the connection between layers.

Some subsurface irrigation system utilize subsurface emitters. While subsurface emitters may reduce evaporation to provide more efficient irrigation, they create another problem. This is that the roots of the plants tend to grow into the exit openings of the emitters. This can result in the emitters becoming clogged and, in the worst case scenario, completely blocking the exit of water. This impairs efficient and uniform water distribution in the subsurface irrigation system.

Subsurface irrigation like other systems may be highly dependent on the soil structure. Sandy soils or soils which do not disperse fluids laterally require higher amounts of water to achieve the watering needs of the plant, seedling, crop, or grass. Thus the water savings expected from subsurface irrigation may become lower than expected. Often costly replacement soil is brought in to resolve this. Pointed drip irrigation may also frequently fail when the plant, seedling, or shrub is not placed correctly close to the emitter and dies or receives the water only partially. This may also be true of subsurface irrigation where not all of different types of plants may receive the water from the subsurface irrigation equally. That is, different types of plants may have different planting depths which are not equally served by the subsurface irrigation system.

Typical subsurface irrigation also tends to be configured at a uniform depth over a large area. In some applications, such as desert landscaping, this may be superfluous and may also fail to meet the needs of different, adjacent, landscaping features. Further, such features may require different planting depths and spacing between them.

Typical systems involving prior irrigation mats may also not be compatible with the use of storm water or grey water. This is because specialized tubing with certain markings and specifications must be utilized for storm water or grey water. Thus, subsurface irrigation systems that can effectively incorporate storm or grey water are desired.

SUMMARY

According to the disclosed embodiments, there is a subsurface irrigation system that distributes a source of fluid such as water, recycled water, rain water, water mixed with nutrients or air, gas, oxygen or nitrogen, into an areal source of fluids by dispersing it evenly in a lateral direction to ensure a moist and/or a nutritious root zone environment. This helps to avoid stress on plants that may be caused by extreme discontinuity of fluid supply.

In one embodiment, a subsurface irrigation system is provided that includes a plurality of subsurface irrigation sleeves defining an area that has a first side and a second side. At least one of the first side and the second side is configured to be hydrophilic. The plurality of subsurface irrigation sleeves each include a tunnel. Tubing connects a first sleeve of the plurality of subsurface irrigation sleeves to a second sleeve of the plurality of subsurface irrigation sleeves. The tubing is configured to pass through the tunnels of the plurality of irrigation sleeves. An emitter is disposed on the tubing within the tunnel, the emitter emitting fluid to the area of the plurality of subsurface irrigation sleeves.

In some embodiments, the first sleeve is disposed within soil at a first orientation and the second sleeve is disposed within the soil at a second orientation, where the first orientation is different than the second orientation. Similarly, the first sleeve may be disposed within the soil at a first depth, and the second sleeve may be disposed within the soil at a second depth where the first depth is different from the second depth. The first sleeve may be thermoformed to have a first shape, while the second sleeve may be thermoformed to have a second shape, where the first shape is different from the second shape.

In some embodiments, the tunnel of at least one of the plurality of subsurface irrigation sleeves is disposed along an edge of the sleeve. In this example, the sleeve may be oriented such that the area is substantially vertical.

In some examples, wiring may be disposed within the tunnel of at least one of the plurality of subsurface irrigation sleeves. The wiring may comprise instrumentation to monitor at least one of temperature and soil moisture content. The wiring may also include a heating element to maintain the soil at a predetermined temperature.

The hydrophilic side or sides of the sleeve may be formed from extruded fibers having a plurality of projections extending from a longitudinal axis. The projections define longitudinal channels along the fibers. The projections and channels increase a surface area of the fibers to retain moisture to be distributed by the sleeve.

In another exemplary embodiment, there is method of providing subsurface irrigation. The method comprises providing a plurality of subsurface irrigation sleeves defining an area having a first side and a second side. At least one of the first side and the second side are configured to be hydrophilic, and the plurality of subsurface irrigation sleeves include tunnels.

A first sleeve of the plurality of subsurface irrigation sleeves is connected to a second sleeve of the plurality of subsurface irrigation sleeves via tubing. The tubing may be configured to pass through the tunnels of the plurality of irrigation sleeves. Fluid is supplied through the tubing to an emitter disposed on the tubing within the tunnel. The emitter emits the fluid to the area of the plurality of subsurface irrigation sleeves to distribute water to roots of plants.

In some embodiments the first sleeve may be oriented within soil at a first orientation, and the second sleeve may be oriented within the soil at a second orientation, where the first orientation is different than the second orientation. Similarly, the first sleeve may be positioned within the soil at a first depth, and the second sleeve may be positioned within the soil at a second depth, where the first depth is different from the second depth. The first sleeve may be thermoformed to have a first shape, and the second sleeve may be thermoformed to have a second shape, where the first shape is different from the second shape.

The tunnel of at least one of the plurality of subsurface irrigation sleeves may be disposed along an edge of the sleeve, and the sleeve may be oriented such that the area is oriented substantially vertical.

The method may also include placing wiring within the tunnel of at least one of the plurality of subsurface irrigation sleeves, the wiring comprising instrumentation to monitor at least one of temperature and soil moisture content. The wiring may further comprise a heating element to maintain the soil at a predetermined temperature.

In some embodiments, the hydrophilic side or sides are comprised of extruded fibers having a plurality of projections extending from a longitudinal axis, the projections defining longitudinal channels along the fibers. The method may include connecting the tubing to a storm water or grey water source. The method may also include placing the plurality of sleeves within one or more greenhouse planters.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Subsurface Irrigation Sleeves

Figure 1:
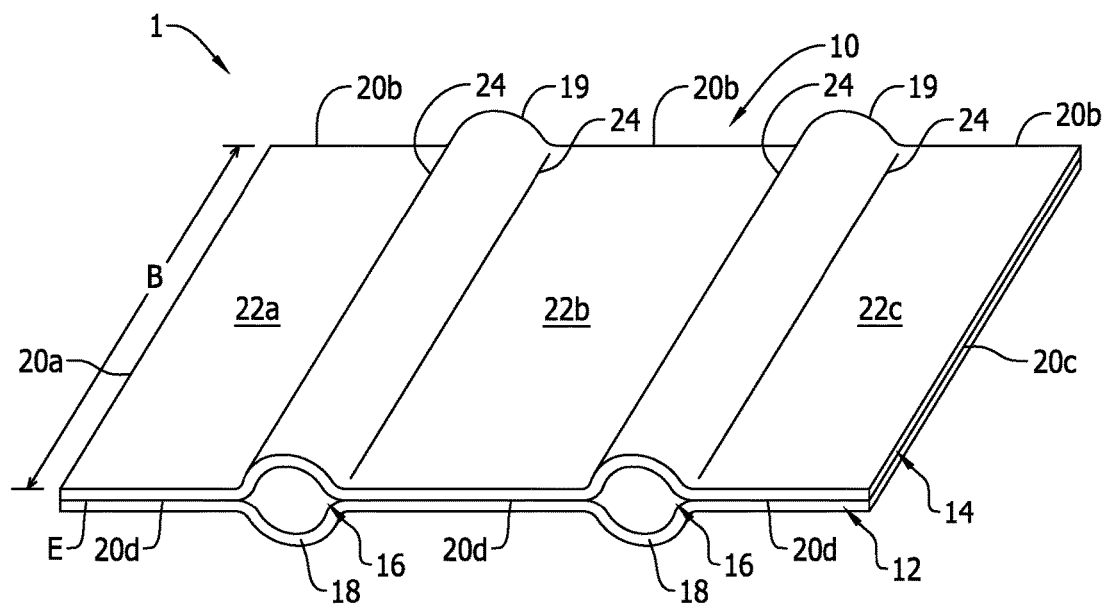
FIG. 1 shows a subsurface irrigation sleeve according to one exemplary embodiment.

FIG. 1 is a perspective depiction of an irrigation system 1 with an irrigation sleeve 10 and two tunnels 16. It is noted that while the present embodiment shows two tunnels 16, and number of tunnels may be incorporated and may be placed on the sleeve 10 at any desired position and orientation. The irrigation sleeve 10 has a lower layer 12 and an upper layer 14 composed of a textile fabric. This textile fabric can be composed of a nonwoven. Each layer has a grammage of, for example, 300 g/m$^2$. When this irrigation system 1 is laid into the soil, the irrigation sleeve 10 is placed so that the upper layer 14 is oriented toward the plants.

The two layers 12, 14 each have two folds 18 and 19 so that between the lower layer 12 and the upper layer 14, two straight tunnels 16 are formed. The tunnels 16 extend over the entire width B of the irrigation sleeve 10. The folds 18, 19 are essentially the same size so that the irrigation sleeve 10 is symmetrically embodied relative to the dividing plane E between the layers 12, 14.

If the two layers 12, 14 are identical, i.e. are in particular composed of an identical material, then the irrigation sleeve can 10 can also be laid so that the positions of the lower layer 12 and the upper layer 14 are reversed.

The irrigation sleeve 10 has four edges 20a through 20d. Between the edges 24 of the folds 18, 19 and the respective edges 20a through 20d, three regions 22a,b,c in total are produced in which the lower and upper layer 12, 14 are attached to each other by means of needling or felting. Other attachment methods may also be employed such as welding, adhesives, or the like. The regions 22a,b,c are exemplary and more or less regions may be incorporated based on the number, position, and orientation of the tunnels 16.

Figure 2:
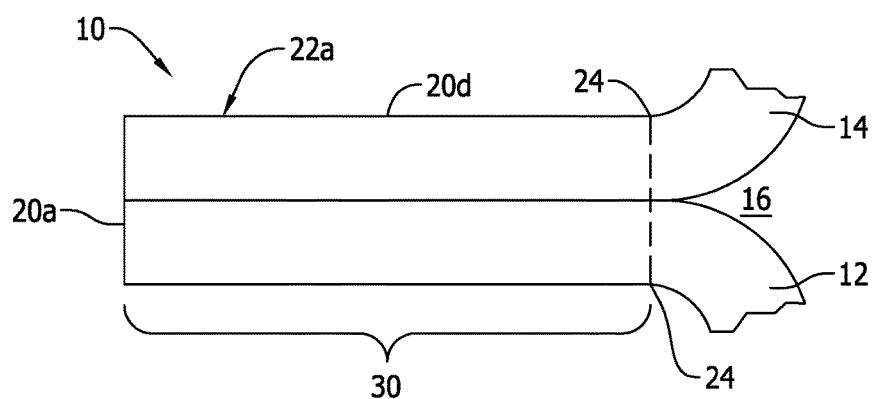
FIG. 2 shows an enlarged cross section view of the irrigation sleeve of FIG. 1.

In the regions 22a,b,c, the lower layer 12 and the upper layer 14 are attached to each other by needling over their entire area, i.e. the entire area of the regions 22a,b,c was used for the needling. This is also shown in FIG. 2, which shows a detail of the end surface of irrigation sleeve 10 from FIG. 1. The needled end surface section 30 extends from the edge 20a to the edge 24 where the layers 12, 14 extend away from each other to form the tunnel 16. The entire available area is needled in the embodiment shown in FIGS. 1 and 2.

By means of the needling, the fibers of the layers 12, 14 resting against each other are looped or felted with each other so that the dividing line between the layers 12, 14 is largely eliminated. This is indicated by the dashed line in FIG. 2. The irrigation sleeve 10 may thus form a single matrix as a result of the needling process.

One or both of the layers 12, 14 can be composed of a hydrophilic or hydrophilized material. In one embodiment, the lower layer 12 is composed of such a material. In addition, at least one layer can be composed of polyester, in particular a polyester nonwoven. In one embodiment, at least the lower layer 12 is composed of a polyester material.

In some embodiments, at least 20%, and in particular at least 50%, of the available areas are attached to each other. An attachment over the entire area is understood to mean that at least 90% of the available areas are attached to each other.

According to an exemplary embodiment, the two layers are attached to each other by needling. The needling, which is also referred to as felting, facilitates a simple attachment over a large area—particularly with regard to nonwoven webs. Needle devices such as needle boards are used. In the needling, the two layers are pierced jointly. The single or multiple in-and-out plunges of the needles cause the fibers of the adjacent layers to become intertwined so that the dividing line between the upper and lower layers is largely eliminated and the two layers together form a uniform, largely homogeneous textile fabric. The production process by means of needling has the additional advantage that it is less expensive than, for example, sewing the individual layers to produce seam-like connections.

This needling process makes positive changes to the fluid absorption and fluid distribution properties of the layers, particularly in the case of nonwoven webs. It has become apparent that layers attached to each other in this way ensure a quicker and more uniform fluid distribution than is the case with textile fabrics that are attached to each other in seam-like fashion.

When the needling process is used, the benefits of capillarity forces may be more efficiently utilized. The needling process changes the material, such as the textile fabric, in at least two ways. The needling reduces the size and amount of the structures of holes filled with air within the polyester fabric. With smaller sized holes, the overall material density is increased. Thus, the fabric has a more organized pattern of holes surrounded by more walls of polyester. Further, the size of variance between such holes is smaller. The capillary forces therefore are increased and the distribution speed of a fluid, such as water, within the fabric is increased.

In comparison to seam-like attachments, the needling over a large area also achieves a significantly more stable attachment between the layers, thus facilitating the processing and placement of irrigation sleeves, particularly of large-area ones. Since this attachment of layers does not come loose, the irrigation tubes between the layers cannot slip, thus ensuring a uniform fluid distribution in the irrigation sleeve. In essence, the irrigation sleeve forms a single matrix as a result of the needling process.

A "textile fabric" is understood to include all textiles that are permeable to fluids, for example wovens, nonwovens, composite materials, geotextiles, geogrids, or films, that have the capacity to distribute the fluid, such as water, particularly through capillary action.

In one exemplary embodiment, the textile fabric is a nonwoven. One layer of a nonwoven material may have a grammage of 100 to 1000 $g/m^2$. In some embodiments, grammage ranges are from 100 to 300 $g/m^2$. A grammage of at least 100 $g/m^2$ is required in order to ensure a stable needling.

In an exemplary embodiment, the textile fabric is composed of at least one layer of a polyester, in particular a polyester nonwoven. In some embodiments, at least the lower layer is composed of a textile fabric made of polyester, in particular a polyester nonwoven. It is also possible for both layers to be produced from these materials, which simplifies the production.

The fluid absorption capacity and the fluid distribution properties can be further improved if at least one layer, such as the lower layer, is composed of a hydrophilic or hydrophilized material. Hydrophilic fabrics have the advantage that they absorb the fluid, in particular water, better and in greater quantities, can store it for longer periods of time, and can also distribute the fluid better in the irrigation sleeve.

Polyester materials such as the fibers of polyester nonwovens are not inherently hydrophilic. In order to improve the properties with regard to fluid absorption and fluid distribution, this material can also be subjected to an additional hydrophilizing. The materials may be formed from new or recycled materials of comprised of hydrophilic polymers. Other polyesters, polypropylene and hydrophilic natural fibers and materials may be used.

In one exemplary embodiment, the irrigation sleeve is equipped with an absorbent powder for storing the fluid. The absorbent powder increases the storage capacity of the irrigation sleeve without requiring an increase in the grammage. The absorbent material swells and has the advantage that it does not release fluid, even under pressure. Only the roots have the ability to retrieve the fluid, in particular the water, from the absorbent powder. The absorbent powder is able to absorb several times its own weight in fluid, in particular water.

In some embodiments, the irrigation sleeve has a powder composed of mycorrhizal fungi. The mycorrhizal fungi supply the plants with nutrient salts and water and in return receive a part of the assimilates that are produced by the photosynthesis of the plants. This symbiosis strengthens the roots and the plants as a whole.

In an exemplary embodiment, the powder, in particular the absorbent powder and the powder composed of mycorrhizal fungi, is/are accommodated between the upper layer and lower layer. The powder can be strewn onto the lower layer during the production of the irrigation sleeve. Because the two layers are attached to each other over a large area, in particular by being needled over a large area, the powder can be fixed between the layers.

The powder can also be integrated into at least one layer. The integration of the powder may take place during the production of the textile fabric. When nonwovens are produced, the powder may be added to the raw material for the nonwoven production, which has the advantage that the powder is uniformly distributed in the layer, particularly in the nonwoven. If the nonwoven is produced by a needling process, then the powder may be strewn into the raw material before the needling.

The irrigation sleeve may be provided with 5 to 40 g/m$^2$ of absorbent powder and/or 10 to 50 g/m$^2$ powder composed of mycorrhizal fungi. In some embodiments, 10 to 30 g/m$^2$ of absorbent powder, or 10 to 20 g/m$^2$ of absorbent powder, are used. With regard to the powder composed of mycorrhizal fungi, some embodiments may use 20 to 40 g/m$^2$, or 20 to 30 g/m$^2$.

The powders may be integrated into the lower layer. If powders of this kind are strewn or integrated into the layers, it is advantageous if the grammage of the involved layer is at least 300 g/m$^2$ to 1000 g/m$^2$.

Figure 3:
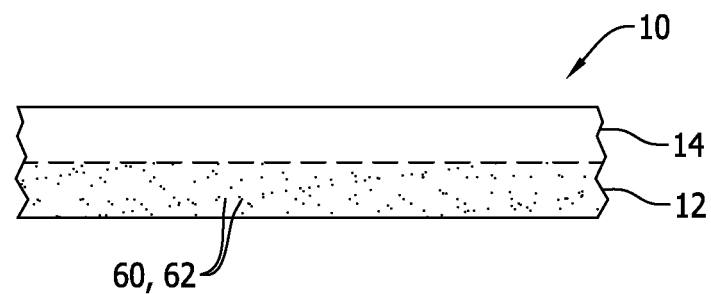
FIG. 3 shows a cross section view of a subsurface irrigation sleeve with absorbent powder in one layer, according to an exemplary embodiment.
Figure 4:
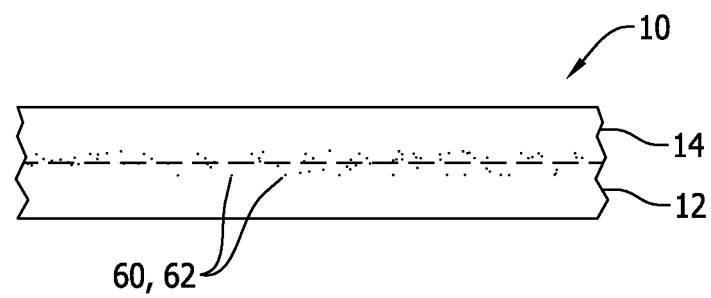
FIG. 4 shows a cross section view of a subsurface irrigation sleeve with absorbent powder throughout both layer, according to an exemplary embodiment.

FIGS. 3 and 4 show two details of irrigation sleeves 10 according to other embodiments. As shown in FIG. 3, an absorbent powder 60 and/or a powder 62 composed of mycorrhizal fungi is incorporated into the lower layer 12. In one exemplary embodiment, the quantity of absorbent powder 60 is preferably 15 g/m$^2$. In another exemplary embodiment, the quantity of powder 62 composed of mycorrhizal fungi is preferably 30 g/m$^2$.

FIG. 4 shows another embodiment in which the powder 60 and/or 62 has been strewn in during the production of the irrigation sleeve 10. The powder 60, 62 is preferably strewn onto the lower layer 12 before the upper layer 14 is placed onto it and attached to the lower layer 12 by means of needling. The needling causes the powder 60, 62 to be distributed in a largely uniform fashion in the contact region between the two layers 12, 14.

Subsurface Irrigation System

Figure 5:
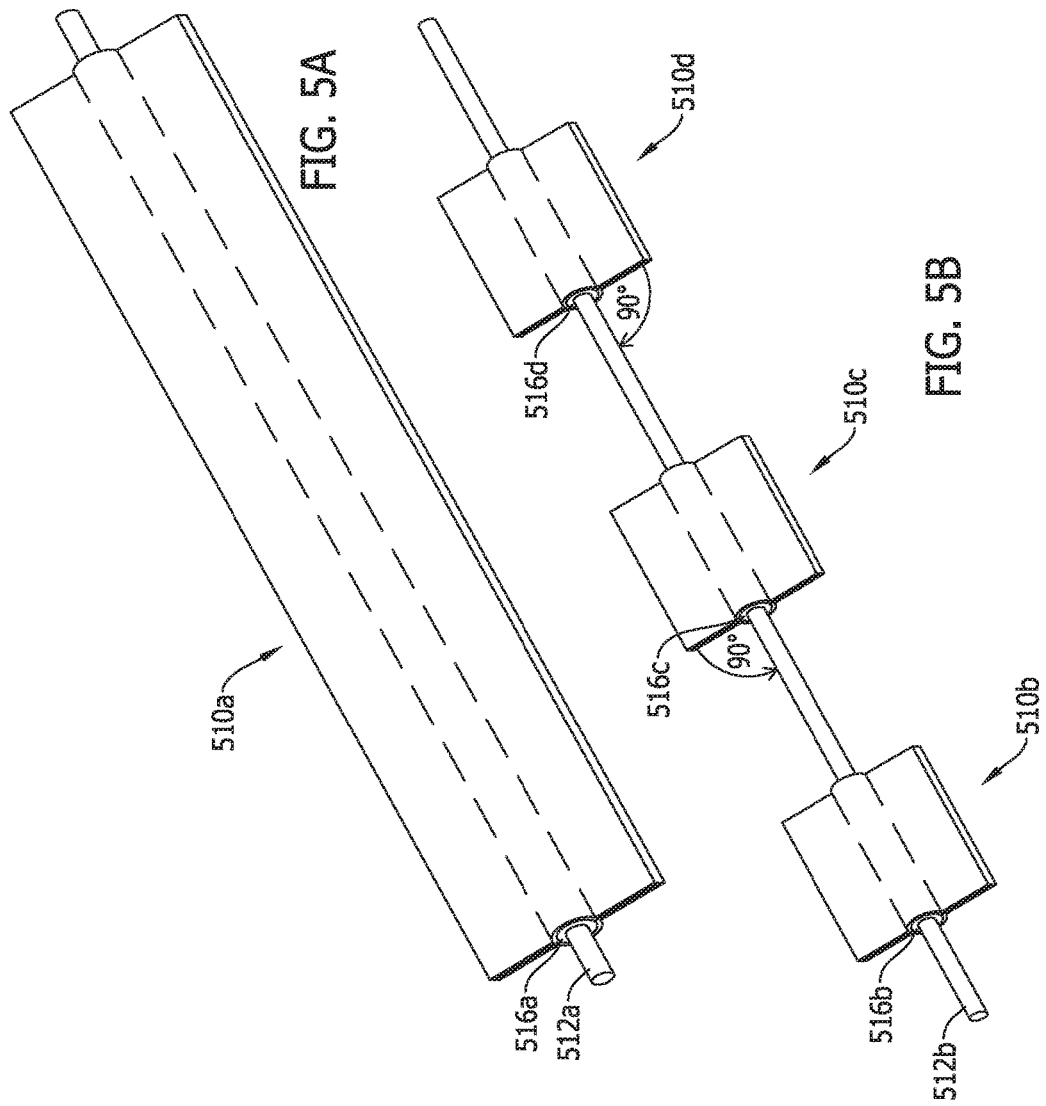
FIG. 5A and FIG. 5B show a subsurface irrigation system comprising a plurality of subsurface irrigation sleeves according to one exemplary embodiment.

According to one embodiment, the irrigation system may include a number of sleeves that are sized and oriented to work with varying landscape features. FIG. 5A and FIG. 5B show configurations of variable irrigation sleeves. In FIG. 5A, there may be an irrigation sleeve 510a. The irrigation sleeve 510a may be constructed in a similar fashion as sleeve 10 described above. The irrigation sleeve 510a is formed in a long, skinny shape. The irrigation sleeve 510a distributes a fluid from tubing 512a. The tubing 512a may be inserted into the tunnel 516a of the sleeve 510a. Such an irrigation sleeve may be suitable for a row of similar, closely spaced plants, such as for agriculture.

As shown in FIG. 5B, there may also be a series of sleeves 510b,c,d joined by tubing 512b. The tubing 512b separates the sleeves 510b,c,d such that the sleeves may be oriented and positioned differently from one another. For example, the first sleeve 512b may be placed at a first depth and orientation, the second sleeve 512c may be placed at a second depth and orientation, and the third sleeve 512d may be placed at a third depth and orientation. In this manner, the subsurface irrigation system may be specifically tailored to the needs of various plants in a landscape design.

Figure 6:
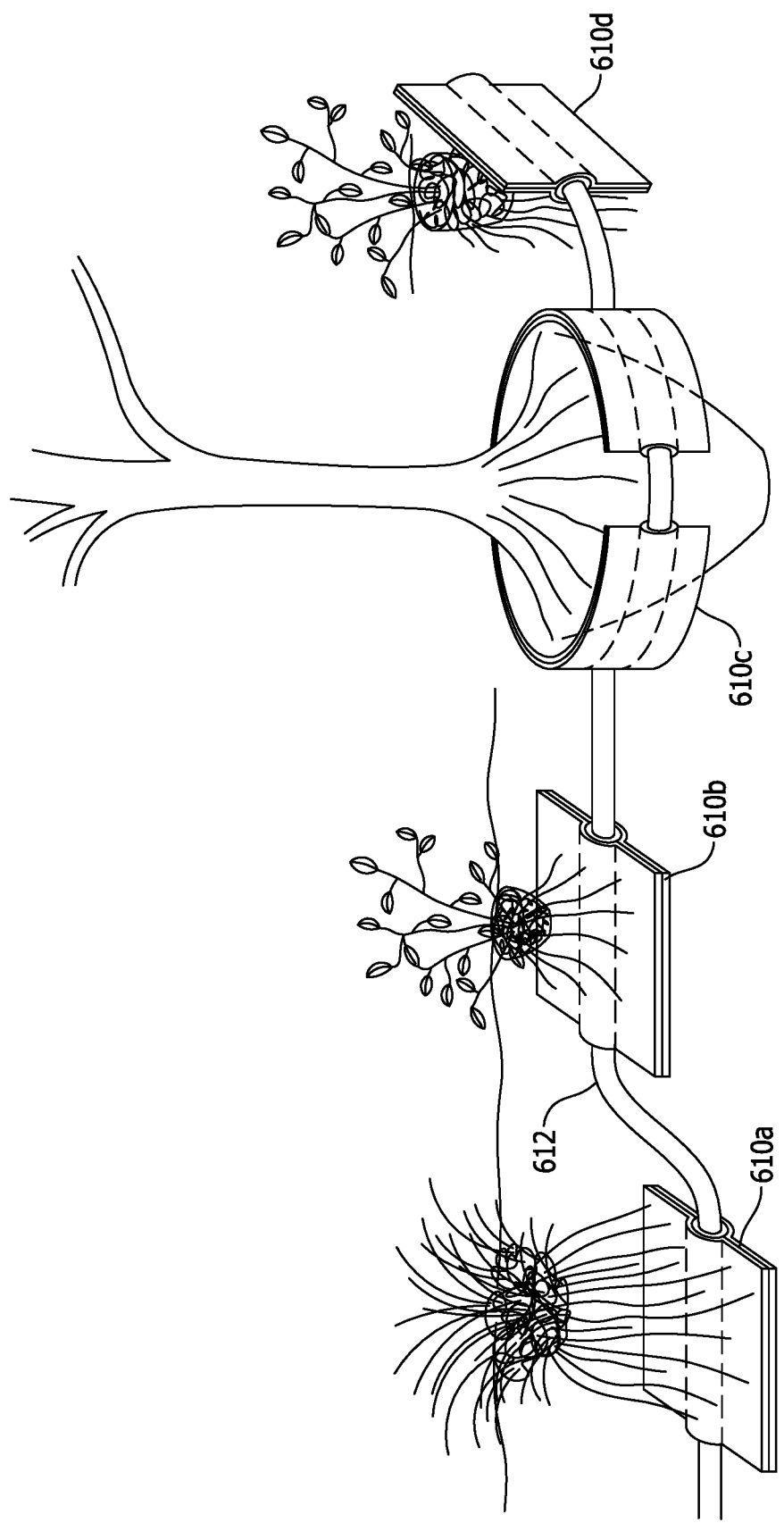
FIG. 6 shows an exemplary layout of a subsurface irrigation system.

An example of this is shown in FIG. 6. In FIG. 6, a first sleeve 610a is oriented at a depth suitable for one of the plants making up the landscaping design. In comparison to the first sleeve 610a, the second sleeve 610b is disposed at a more shallow depth in the soil. This is to accommodate a different type of plant with a different root structure than the first plant. A third sleeve or series of sleeves 610c is provided around a root system of a tree. Here, the sleeve or sleeves 610c are oriented in a vertical, cylindrical shape. This orientation concentrates water into the large root system of the tree. A fourth sleeve 610d is oriented so that the sleeve is in a vertical plane in the soil. In this manner, the sleeve 610d may be easily accessed for maintenance while still providing water at sufficient depths for the plant. Each of the sleeves 610a,b,c,d The sleeves 610a,b,c,d may be configured to direct water to the root system of plants. The sleeves 610a,b,c,d may thus have a hydrophilic side oriented towards the roots of the plants, and a hydrophobic side oriented away from the roots of the plants. This further increases the efficiency of the subsurface irrigation system. For example, one side may be formed from polypropylene with hydrophilic properties, while the other side may be formed from polyester (PES) or PET.

The configuration shown in the design of FIG. 6 is exemplary, and other configurations may be used. For example, sleeves may configured in various shapes, orientations, and positions to match any landscape design. The sleeves may be made to be flexible to be formed onsite into needed shapes to accommodate the landscape design. The sleeves may alternatively be preformed in a variety of shapes for use on site. For examples, the sleeves may be manufactured through thermoforming the material into the desired different shapes.

Figure 7:
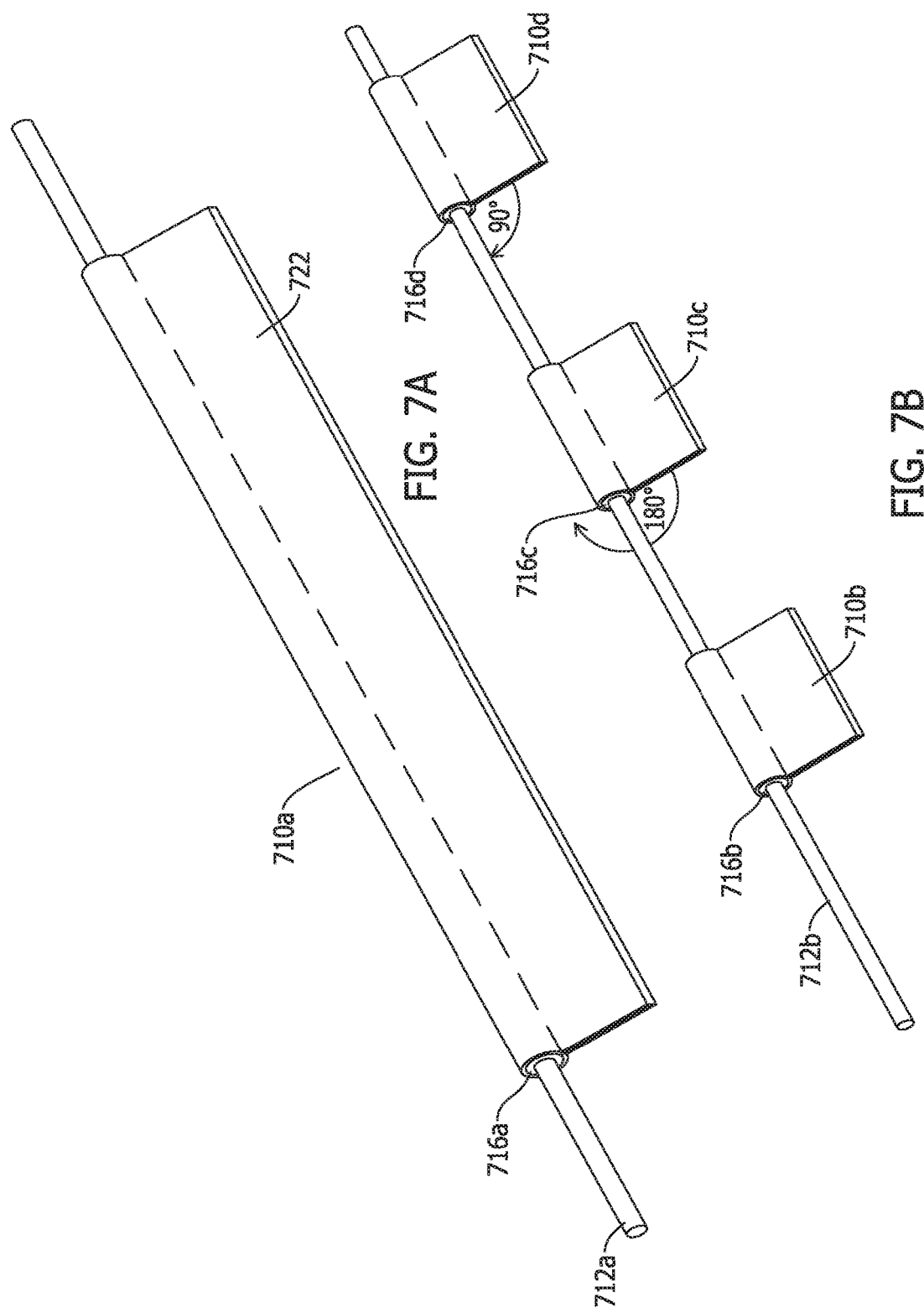
FIG. 7A and FIG. 7B show an alternative subsurface irrigation system comprising a plurality of subsurface irrigation sleeves according to one exemplary embodiment.

Another embodiment of a subsurface irrigation system is shown in FIG. 7A and FIG. 7B. In FIG. 7A, there is a sleeve 710a similar to sleeves 10, 510, and 610. However, sleeve 710a is constructed with a tunnel 716a disposed on the side of the sleeve 710a. The connected layers 722 of the sleeve 710a extend from the tunnel 716a to the other side of the sleeve 710a opposite the tunnel 716a. Tubing 712a may be extended through the tunnel 716a of the sleeve 710a to provide fluid to the sleeve 710a.

Similarly, as shown in FIG. 7B, a plurality of sleeves 710b,c,d may be incorporated with tubing 712b. The plurality of sleeves 710b,c,d may be oriented in different planes from one another and at different depths and distances from one another to accommodate different landscape designs. The sleeves 710b,c,d include tunnels 716b,c,d on one side of the sleeves similar to sleeve 710a. It is noted that the plurality of sleeves 710b,c,d is exemplary and a greater or lesser number or sleeves may be utilized. Further, sleeves having tunnels at different locations from one another may also be utilized.

Figure 8:
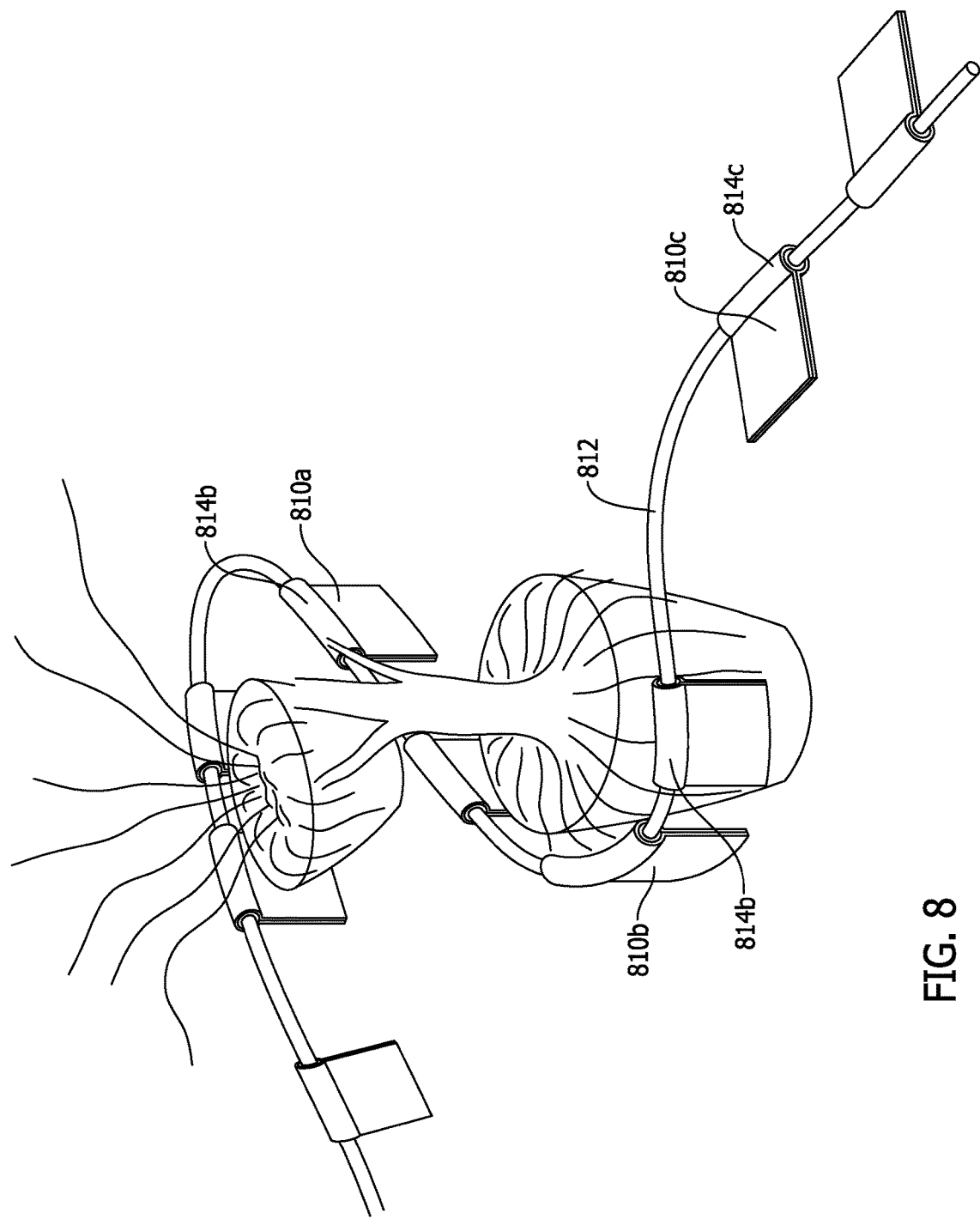
FIG. 8 shows an exemplary layout of a subsurface irrigation system.

The sleeves with the tunnels on one side of the sleeve may offer a number of advantages. One such advantage will be explained with reference to FIG. 8. In FIG. 8, a first set of sleeves 810a with tubing 812 wrap around a first plant. The sleeves 810a may be configured such that a hydrophilic side of the sleeves is facing towards the first plant. A second set of sleeves 810b with tubing 812 wrap around a second plant. The sleeves 810b may be configured such that a hydrophilic side of the sleeves is facing towards the second plant. The sleeves 810a and 810b are oriented vertically and extend from the tunnel side 814a,b of the sleeves 810a,b. A third set of sleeves 810c is provided along the tubing 812. The sleeves 810c are oriented horizontally and may extend in either direction from the tunnel side 814c of the sleeves 810c.

With the sleeves 810a,b,c so configured, the subsurface irrigation may effectively provide fluids, such as water, to various plants in the landscape design. Further, with the sleeves 810a,b,c having the tunnel side 814a,b,c at surface level or at a shallow depth within the soil, the subsurface irrigation system may be easily maintained. This is because the tubing and the sleeves are easily access due to the placement of the tubing at or near the surface.

This configuration of a subsurface irrigation system may be advantageous in agricultural applications. For example, a row of sleeves such as those shown in FIG. 8 may be placed along a row of crops. The sleeves may provide water to the crops while allowing for easy access to maintain the sleeves, tubing, and the crops.

Greenhouse Application

Figure 9:
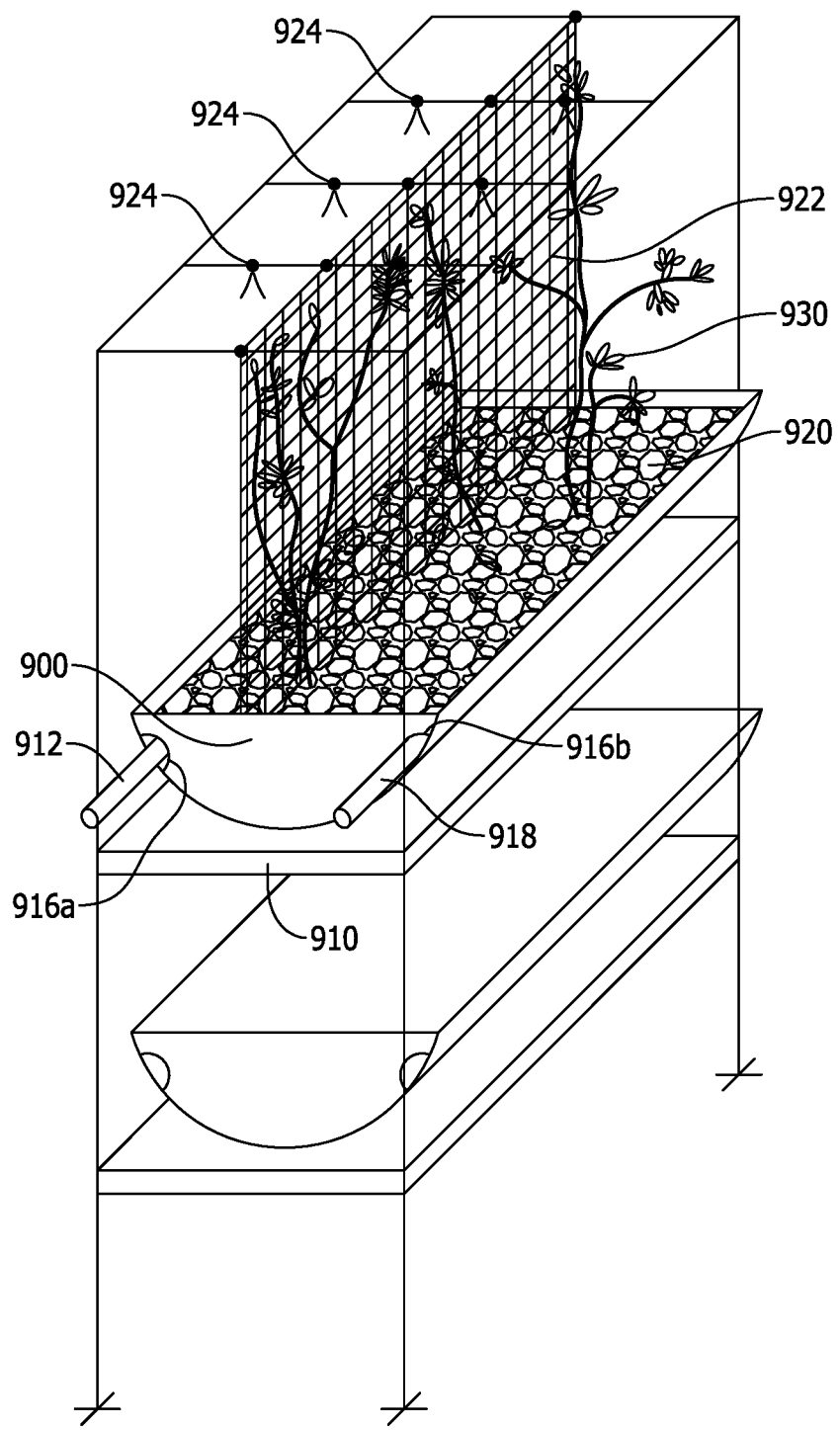
FIG. 9 shows an exemplary greenhouse application of a subsurface irrigation system.

FIG. 9 shows an embodiment of a subsurface irrigation system applied in a greenhouse environment. In this embodiment, a planter box 900 is provided with soil 920. The planter box may also comprise a plant climbing structure 922 and growing lights 924 such as fluorescent or LED lighting. The planter box 900 may include a subsurface irrigation sleeve 910, or in some embodiments, the planter box 900 may be formed by the sleeve 910. The sleeve 910 may be configured to have a hydrophilic side in contact with the soil 920, and a hydrophobic side directed towards the planter box 900, or away from the soil 920. In this embodiment, the sleeve 910 may be thermoformed into a rounded shape to conform to the shape of the planter box 900.

In this embodiment, the sleeve 910 may include a first tunnel 916*a* and a second tunnel 916*b*. The tunnels 916*a,b* are shown in this embodiment to be on the sides of the sleeve 910, however, the tunnels 916*a,b* may be disposed at any suitable position. The first tunnel 916*a* may accommodate tubing 912 to transport fluid to the sleeve 910 to transfer to the soil 920. For example, the tubing 912 may transport water, air, fertilizer, or a combination of such to transfer to the soil 920. The second tunnel 916*b* may accommodate other features incorporated by the greenhouse system. For example, the second tunnel may accommodate heating or instrumentation wiring 918 to monitor the soil 920 for moisture content and/or temperature and to maintain the soil 920 at a certain temperature.

Subsurface Irrigation System with Standard Drip Systems

Figure 10A:
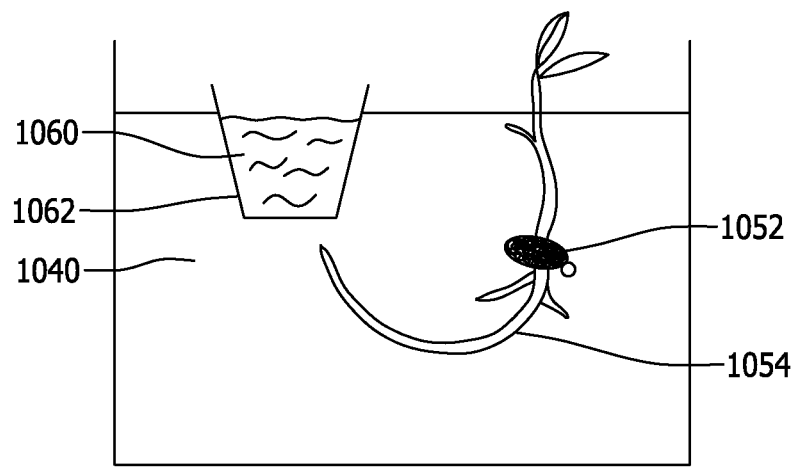
FIG. 10A shows plant behavior near a water source.
Figure 10B:
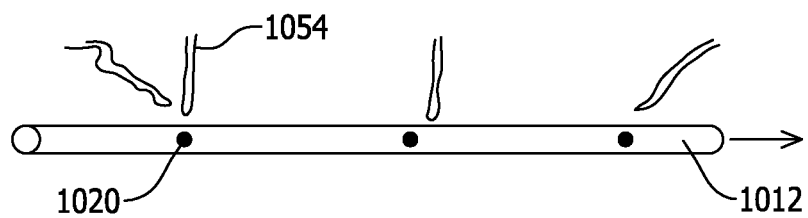
FIG. 10B shows roots penetrating subsurface drip emitters.

The use of the above described sleeve also has the advantage of being used with any standard drip irrigation system. The drip irrigation systems are configured such that an emitter is disposed within the sleeve to deliver the fluid to be dispersed by the sleeve. In typical subsurface irrigation systems, specialized emitters are required. As shown in FIG. 10A, plants' root systems tend to grow towards the source of water. That is the roots 1054 that grow from the seedling 1052 tend to grow towards the source of water 1060 (shown as a porous pot 1062 sitting in the soil 1040). As shown in FIG. 10B, this results in the roots 1054 growing towards the emitters 1020 of a typical drip irrigation system. Left unchecked, the roots 1054 tend to grow into and clog the emitters, resulting in damage to the irrigation system, and less effective dispersal of the fluid to the soil.

Plants have a hormone known as auxin which plays a role in, among other things, the plants' root growth and development. Among other things, this hormone causes the roots to grow towards a water source, even if they must grow, for example, perpendicular to the force of gravity as shown in FIG. 10A. Thus, even if the emitters are placed at a distance from the roots of the plants, the roots tend to eventually find the emitters, grow into them, and clog them.

In typical subsurface irrigation systems, the emitters are configured to interact with auxin to inhibit root growth near the emitters. For example, a chemical may be applied to the emitters, or copper may be used in the emitter which produces ions that react with auxin to prevent the growth of the roots into the emitters.

Figure 10C:
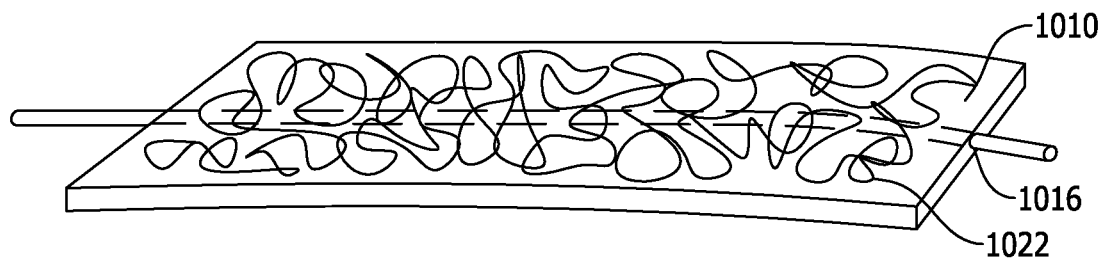
FIG. 10C shows a sleeve as a part of a subsurface irrigation system.
Figure 11:
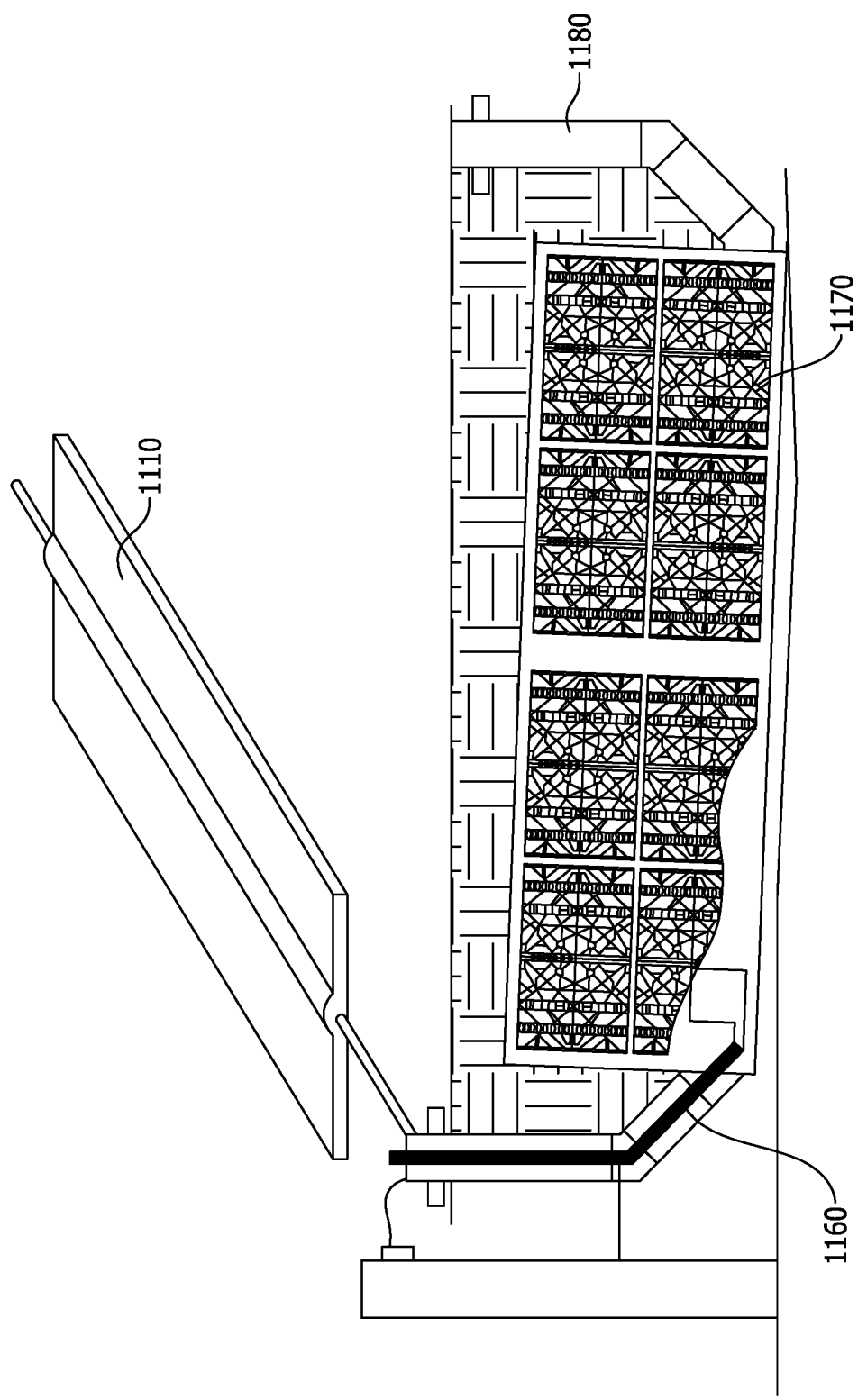
FIG. 11 shows a subsurface irrigation sleeve as part of a net zero water filtration system.

With the use of the sleeves of the present embodiments as shown in FIG. 10C, the water is dispersed throughout the sleeve 1010. Thus, the roots of the plants grow towards the larger area of the surface 1022 of the sleeve 1010. The emitter is disposed within the tunnel 1016 of the sleeve, thereby protected from root intrusion because the roots do not identify a point source of fluid as the emitter. Thus, in the present embodiments, there is no need for specialized emitters formed from copper or with other special chemical treatments to prevent root intrusion therein. Instead, the sleeves 1010 may be used with any conventional drip emitting system, reducing the cost and increasing the flexibility of the subsurface irrigation system.

The ability of the sleeves being used with standard drip lines also provides other advantages. For example, the sleeves may be manufactured without integrated drip lines. This allows the standard drip line tubing to be inserted into the sleeves at a work site. Typical, large irrigation mats with integrated drip lines suffer from the drawback of the tubing becoming kinked when such mats are stored and shipped. This is due to the weight and size of the mat. When such large mats, for example a mat sized at 1.2 m×50 m, the mat is rolled or folded to be stored. However, this rolling or folding causes significant kinking and possible damage to the tubing and/or the emitters. Not to mention that such large mats are generally unwieldy for storage and shipping.

These drawbacks are avoided by using the above described sleeve with a standard drip line that is inserted after the sleeves are manufactured, stored, and shipped. Further, by making the sleeves of a more manageable size and weight, such as 1.2 m×30 m, 15 cm×30 m, or smaller to meet the various applications as described above, the damage caused by integrated drip lines may be avoided. Additionally, the various sized sleeves are easier to lift, ship, and store.

Thus, in the present embodiments, the method of assembling the subsurface irrigation system may include manufacturing the sleeves described herein without an integrated drip line, storing and transporting the manufactured sleeves to a worksite for subsurface irrigation, inserting tubing/drip lines into the sleeves, and then placing the completed subsurface irrigation system in a desired place in a landscape. In other embodiments, the sleeves may be prepared for installation and placed into position in the desired place in a landscape, and then the tubing/drip lines may be inserted prior to covering the subsurface irrigation system.

Net-Zero Solutions and Applications

The subsurface irrigation system may facilitate net-zero solutions such as by using rainwater or greywater. In many jurisdictions, use of grey water or rain/storm water is restricted due to safety concerns. For example, a concern would be that pets or young children may come into contact and/or consume such water which may be contaminated with diseases or other harmful pathogens. However, with the subsurface irrigation system, the rain/storm water or grey water remains below the surface of the ground and is never exposed to people or pets.

In one example, a subsurface irrigation sleeve 1110 is used in a storm/rain water recovery system. Here, rain/storm water is input through piping 1160. This water input to the system may also be diverted to the subsurface irrigation system utilizing sleeves 1110. The system also includes filtration system and tank 1170 and output piping 1180. By utilizing the sleeve, the net-zero water solution only needs to filter water being used within the home, while irrigation water does not need to be treated, and remains safely away from contact with children or pets.

Figure 12:
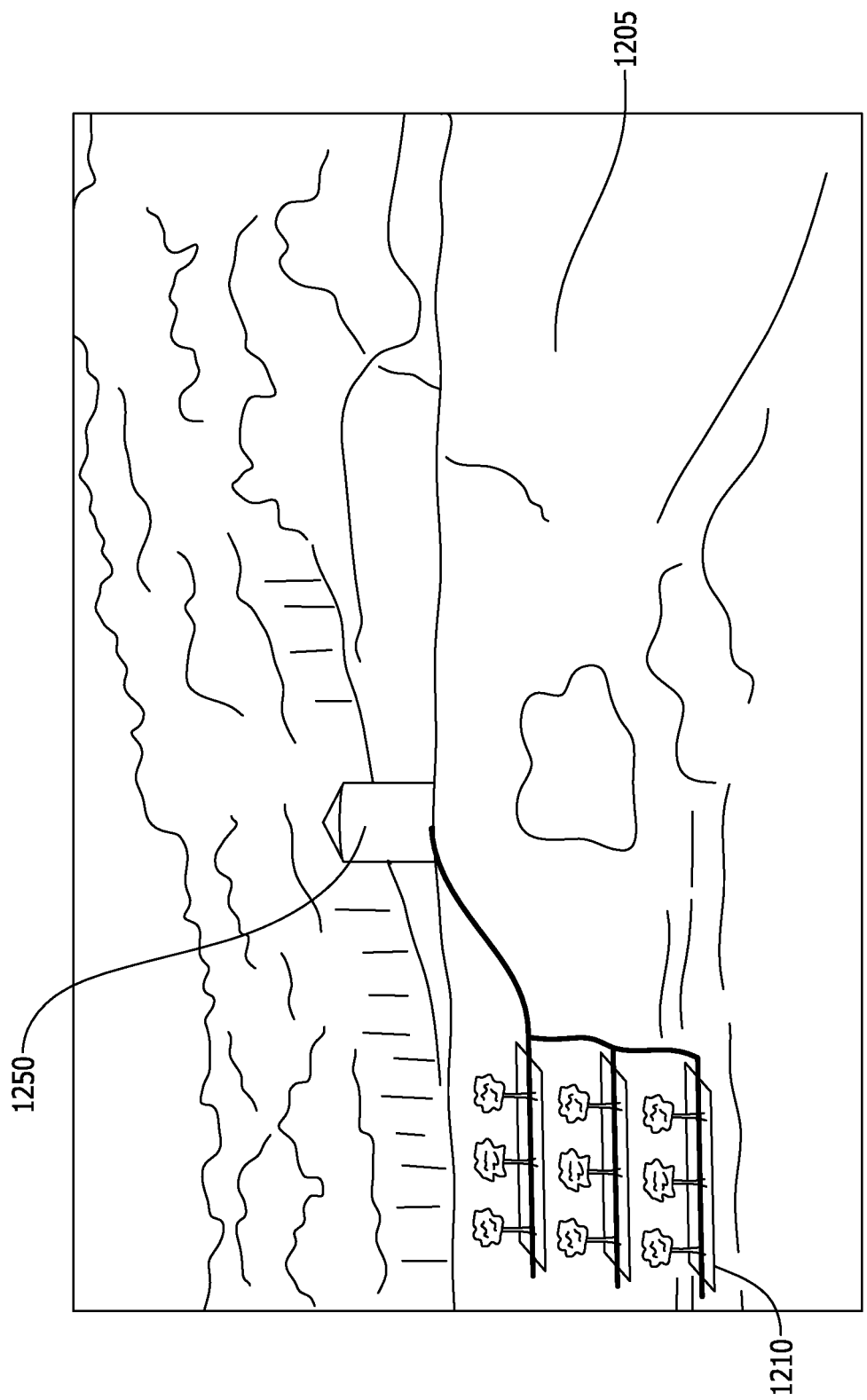
FIG. 12 shows a subsurface irrigation sleeve as part of an erosion control system.

Another example utilizing the sleeve to distribute rain/storm water is in an erosion prevention system as shown in FIG. 12. In a system installed on an incline such as a hill or mountain 1205, there is a rain water tank 1250 that collects extra rain/storm water to prevent it from running down the hill 1205 all at once. Such rain water may then be distributed at a slower pace via the subsurface irrigation sleeves 1210. The placement of the sleeves 1210 as well as the dispersion of roots of plants close to the sleeves will serve to utilize the collected rain water to increase the erosion protection of the system.

High Surface Area Textiles

In typical mats used for subsurface irrigation, the surface of the mats are treated with a chemical absorber to increase the hydrophilic properties of one or both sides of the mat. However, these chemical absorbers have been found to break down over time or based on exposure to extreme temperatures or to light, such as during storage before installation. As a result, typical mats lose their ability to disperse water fairly rapidly.

The sleeves described above are configured to utilize textiles having inherent hydrophilic properties to eliminate the need for such chemical absorbers. For example, such textile fibers may be incorporated into the sleeve such as those described in U.S. Pat. No. 8,129,019, the contents of which are hereby incorporated by reference. An example of such a textile fiber is shown in FIG. 13.

Figure 13:
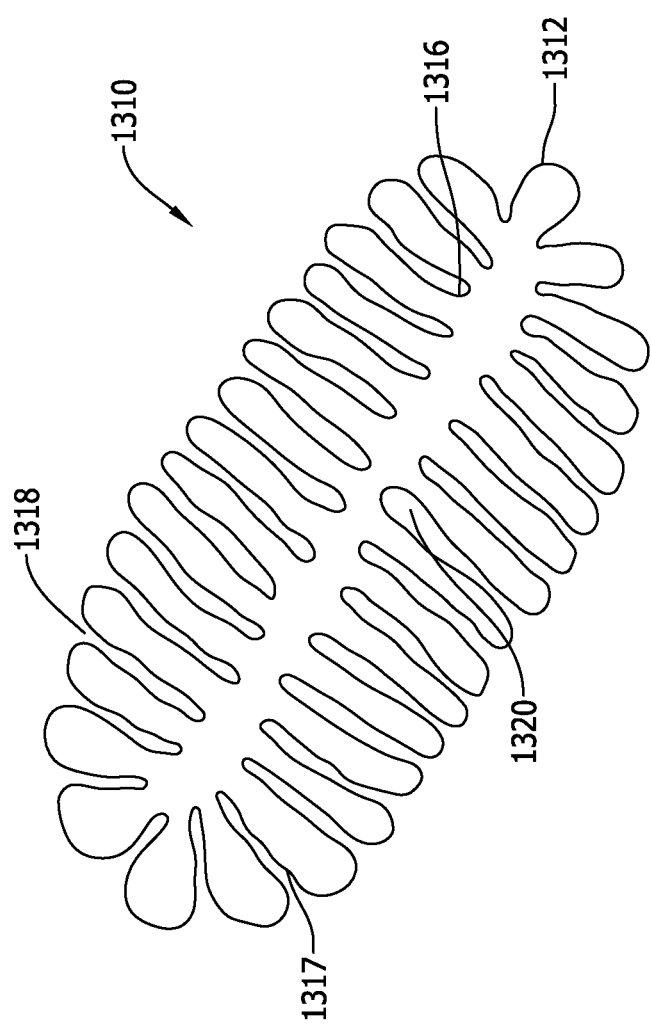
FIG. 13 shows a cross section of a fiber used for a subsurface irrigation sleeve.

As shown in FIG. 13, a fiber 1310 is generally constructed from two different polymer compositions that can be extruded in an oval cross-section, which allows for high processability. Alternatively, the cross-section can be circular or other shapes as desired.

The cross-section of an internal fiber 1312 has a generally winged-shape, or amoeba-like shape. The internal fiber 1312 has a middle region 1316, which is the longitudinal axis 1317 that runs down the center of the internal fiber 1312. The longitudinal axis 1317 has a plurality of projections 1318 that extend from the longitudinal axis 1317. The plurality of projections extend along the periphery of the longitudinal axis 1317. Alternative cross-sectional shapes, such as but not limited to a circular-shape or the like, would have the middle region 1316 formed as a hub where the projections extend from the hub.

In one embodiment, the plurality of projections are uniformly spaced. The plurality of projections 1318 increase the surface areas and surface capillaries for a single fiber. In one embodiment, the plurality of projections 1318 define a plurality of channels 1320, as shown in FIG. 13. The plurality of channels 1320 may be uniformly spaced. The channels 1320 create a surface capillary portion along the length of the fiber 1310 that facilitates the absorption of liquids within the fiber 1310. Accordingly, the surface area of the cross-section of the internal fiber 1312 is dramatically increased due to the plurality of projections 1318.

To further increase the hydrophilic properties of the sleeve, the fiber 1310 may be coated with a hydrophilic absorber. Thus, not only in the surface area of the sleeve enhances with channels 1320 for the absorption of liquids, but the surface treatment also contributes to the hydrophilic properties.

In some embodiments, the sleeves may have a matrix that is constructed of polyethylene terephthalate (PET). PET is not an inherently hydrophilic material. The fibers 1310 may thus be mixed into the core of the matrix to change the material on one or both sides of the sleeve to enhance the hydrophilic properties.

Figure 14A:
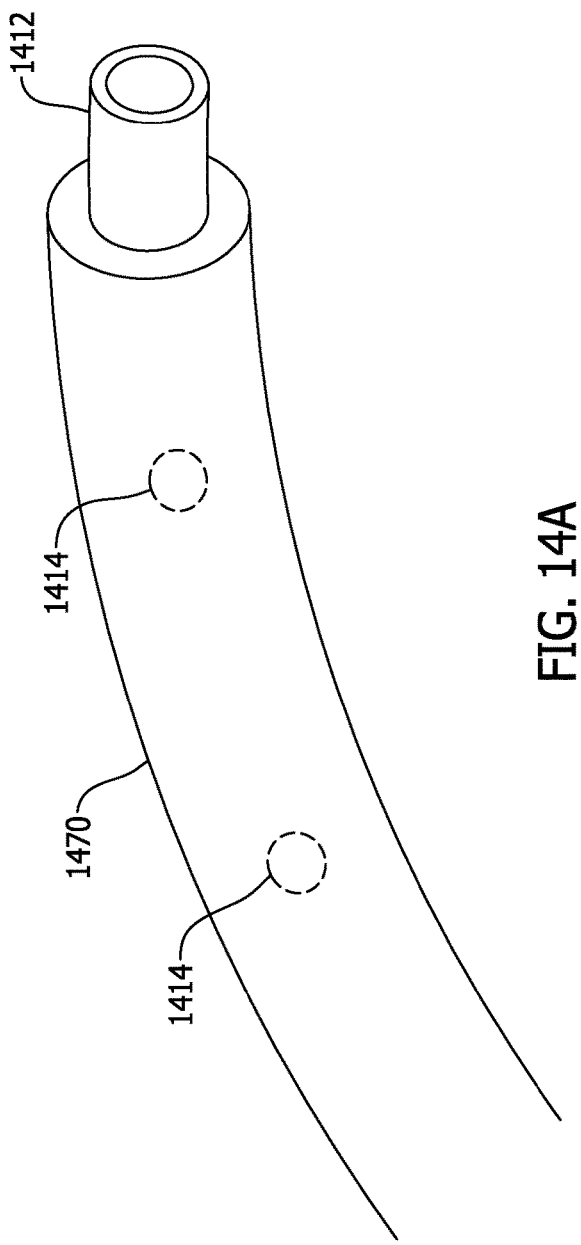
FIG. 14A shows an endless sock according to one embodiment.
Figure 14B:
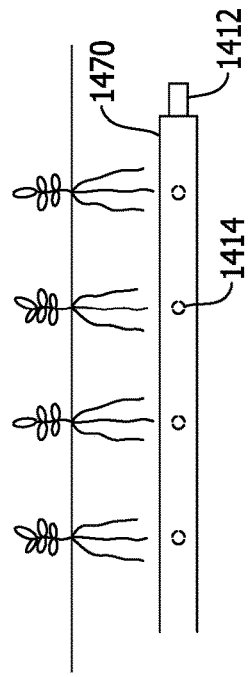
FIG. 14B shows one environment of use for the endless sock shown in FIG. 14A.

In further embodiments, an endless sock formed of the fibers 1312 or similar fibers is provided. An example of an endless sock is shown in FIG. 14A and FIG. 14B. The endless sock 1470 is configured to surround the tubing 1412 such that the tubing slides into the sock. With the fluid transporting properties of the fibers in the sock 1470, the fluids from the tubing 1412 may be effectively transferred and distributed from emitters 1414 on the tube 1412 through the sock 1470 to the roots of plants.

An example of this is shown in FIG. 14B. Here, the tubing 1412 has a sock 1470 placed over it such that the sock 1470 supplies fluid to a row of plants. The sock 1470 provides a number of advantages. The sock 1470 may be formed to be flexible to secure snugly around the tubing 1412. The sock 1470 may be cut to any size to accommodate any landscape design. This allows landscapers to build the system at a worksite in an efficient manner. The sock 1470 may thus advantageously supply fluids to a row of plants. Such a configuration may be particularly advantageous in agricultural applications.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A subsurface irrigation system comprising:
   a plurality of subsurface irrigation sleeves comprising a single-matrix area having a first side and a second side, at least one of the first side and the second side being configured to be hydrophilic, and comprising a tunnel at a fold in the first side and the second side where the first side and the second side are separated from one another to form the tunnel;
   tubing connecting a first sleeve of the plurality of subsurface irrigation sleeves to a second sleeve of the plurality of subsurface irrigation sleeves, the tubing being configured to pass through the tunnels of the plurality of irrigation sleeves; and
   an emitter being disposed on the tubing within the tunnel of each of the plurality of subsurface irrigation sleeves, the emitter emitting fluid to the single-matrix area of the plurality of subsurface irrigation sleeves,
   wherein the at least one of the first side and the second side is comprised of extruded fibers having a plurality of projections extending from a longitudinal axis, the projections defining longitudinal channels along the fibers.

2. The subsurface irrigation system of claim 1, wherein the first sleeve is disposed within soil at a first orientation and the second sleeve is disposed within the soil at a second orientation, the first orientation being different than the second orientation.

3. The subsurface irrigation system of claim 2, wherein the first sleeve is disposed within the soil at a first depth and the second sleeve is disposed within the soil at a second depth, the first depth being different from the second depth.

4. The subsurface irrigation system of claim 1, wherein the single-matrix area of the first sleeve is thermoformed to have a first shape and curvature to correspond to a first landscaping features and the single matrix area of the second sleeve is thermoformed to have a second shape and curvature to correspond to a second landscaping feature, the first shape and curvature being different from the second shape and curvature.

5. The subsurface irrigation system of claim 1, wherein the tunnel of at least one of the plurality of subsurface irrigation sleeves is disposed along an edge of the sleeve at the edge the of the single-matrix area.

6. The subsurface irrigation system of claim 5, wherein the at least one of the plurality of subsurface irrigation sleeves is oriented such that the single-matrix area is substantially vertical.

7. The subsurface irrigation system of claim 1, further comprising wiring disposed within the tunnel of at least one of the plurality of subsurface irrigation sleeves.

8. The subsurface irrigation system of claim 7, wherein the wiring comprises instrumentation to monitor at least one of temperature and soil moisture content.

9. The subsurface irrigation system of claim 8, wherein the wiring further comprises a heating element to maintain the soil at a predetermined temperature.

10. The subsurface irrigation system of claim 1, wherein the extruded fibers are comprised of a polyester material.

11. A method of providing subsurface irrigation, the method comprising:
   providing a plurality of subsurface irrigation sleeves comprising a single-matrix area having a first side and a second side, at least one of the first side and the second side being configured to be hydrophilic comprising extruded fibers having a plurality of projections extending from a longitudinal axis, the projections defining longitudinal channels along the fibers, and the plurality of subsurface irrigation sleeves each comprising a tunnel at a fold in the first side and the second side where the first side and the second side are separated from one another to form the tunnel;
   connecting a first sleeve of the plurality of subsurface irrigation sleeves to a second sleeve of the plurality of subsurface irrigation sleeves via tubing, the tubing being configured to pass through the tunnels of the first and second sleeves; and
   supplying fluid through the tubing to an emitter disposed on the tubing within the tunnel of each of the plurality of irrigation sleeves, the emitter emitting the fluid to the single-matrix area of the plurality of subsurface irrigation sleeves to distribute water to roots of plants.

12. The method of claim 11, further comprising orienting the first sleeve within soil at a first orientation and the second sleeve within the soil at a second orientation, the first orientation being different than the second orientation; and
   positioning the first sleeve within the soil at a first depth and the second sleeve within the soil at a second depth, the first depth being different from the second depth.

13. The method of claim 11, wherein the single-matrix area of the first sleeve is thermoformed to have a first shape and curvature to correspond to a first landscaping feature and the single-matrix area of the second sleeve is thermoformed to have a second shape and curvature to correspond to a second landscaping feature, the first shape and curvature being different from the second shape and curvature.

14. The method of claim 11, wherein the tunnel of at least one of the plurality of subsurface irrigation sleeves is disposed along an edge of the sleeve at the edge the of the single-matrix area, and the at least one of the plurality of subsurface irrigation sleeves is oriented such that the single-matrix area is oriented substantially vertical.

15. The method of claim 11, further comprising placing wiring within the tunnel of at least one of the plurality of subsurface irrigation sleeves, the wiring comprising instrumentation to monitor at least one of temperature and soil moisture content.

16. The method of claim 15 wherein the wiring further comprises a heating element to maintain the soil at a predetermined temperature.

17. The method of claim 11, further comprising connecting the tubing to a storm water or grey water source.

18. A subsurface irrigation system comprising:
   a plurality of subsurface irrigation sleeves comprised of extruded fibers having a plurality of projections extending from a longitudinal axis, the projections defining longitudinal channels along the fibers, the plurality of subsurface irrigation sleeves each comprising a single-matrix area having a first side and a second side, at least one of the first side and the second side being configured to be hydrophilic, and a tunnel formed at a fold in the first side and the second side where the first side and the second side are separated to form the tunnel, the plurality of subsurface irrigation sleeves comprising a first sleeve with the single-matrix area being thermoformed to have a first shape and curvature configured to correspond to a first landscaping feature, and a second sleeve thermoformed to have a second shape and curvature configured to correspond to a second landscaping feature, the first shape and curvature being different from the second shape and curvature;
   tubing connecting a first sleeve of the plurality of subsurface irrigation sleeves to a second sleeve of the plurality of subsurface irrigation sleeves, the tubing being configured to pass through the tunnels of the plurality of irrigation sleeves; and
   an emitter being disposed on the tubing within the tunnel, the emitter emitting fluid to the plurality of subsurface irrigation sleeves.

* * * * *

Disclaimer

10,091,956 B2 - Jutta M. Gietl, Reno, NV (US); Adelheid Putze, Henderson, NV (US). SUBSURFACE IRRIGATION SYSTEMSS AND METHODS. Patent dated October 9, 2018. Disclaimer filed August 22, 2022, by the assignee, E. M. P. Enterprises, Inc.

I hereby disclaim the following complete claims 1-18 of said patent.

*(Official Gazette, March 14, 2023)*